United States Patent [19]

Hanaoka, deceased

[11] Patent Number: 5,090,719
[45] Date of Patent: Feb. 25, 1992

[54] FOUR WHEEL STEERING TRAILER

[75] Inventor: Hiroshi Hanaoka, deceased, late of Tokyo, Japan, by Shigeru Hanaoka, legal representative

[73] Assignee: Hanaoka Sharyo Co., Ltd., Tokyo, Japan

[21] Appl. No.: 666,432

[22] Filed: Mar. 11, 1991

Related U.S. Application Data

[63] Continuation of Ser. No. 404,013, Sep. 7, 1989, abandoned.

[30] Foreign Application Priority Data

Sep. 12, 1988 [JP] Japan ............... 63-119438[U]

[51] Int. Cl.⁵ ........................................ B62D 13/00
[52] U.S. Cl. .................................. 280/408; 280/445; 280/91; 280/99
[58] Field of Search ............... 280/91, 99, 100, 408, 280/444, 445; 180/265

[56] References Cited

U.S. PATENT DOCUMENTS

| | | | |
|---|---|---|---|
| 1,585,753 | 5/1926 | Arato | 280/99 |
| 3,596,730 | 8/1971 | Cecce | 280/91 |
| 3,853,330 | 12/1974 | Hanaoka | 280/99 |
| 3,872,794 | 3/1975 | Goode | 280/408 |

FOREIGN PATENT DOCUMENTS 679130 1/1930 France ............... 280/99

Primary Examiner—Mitchell J. Hill
Attorney, Agent, or Firm—Armstrong, Nikaido, Marmelstein, Kubovcik & Murray

[57] ABSTRACT

A trailer having front and rear pairs of wheels, each wheel being rotatably supported on a knuckle arm having a pivotal shaft tilted inwardly for biasing the wheel to a straight line position, a front tow bar pivotally mounted on a front steering member pivotally secured to the trailer body, a rear steering member pivotally mounted on a rear portion of the trailer body, a pair of tie rods connecting the knuckle arms of the front wheels and the front tow bar and a pair of rear tie rods connecting the knuckle arms of the rear wheels and the rear steering member, a rear stabilizer rear stabilizer having a spring for urging the rear steering member straight ahead between the rear steering member and the trailer body and a front stabilizer between the front tow bar and the body.

4 Claims, 5 Drawing Sheets

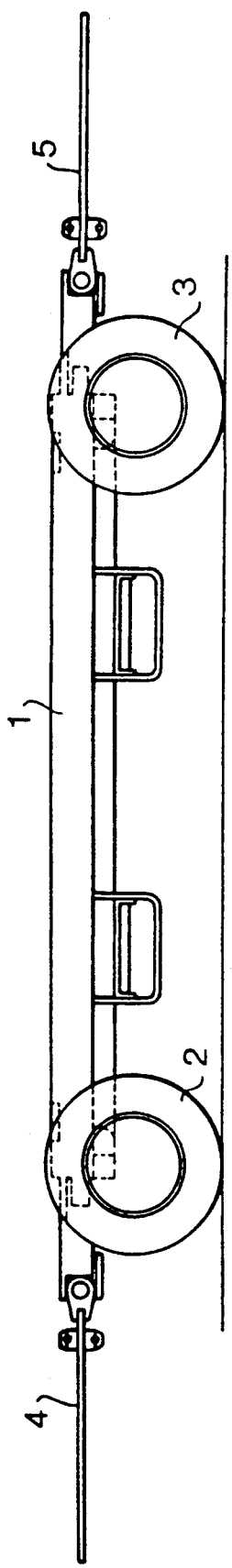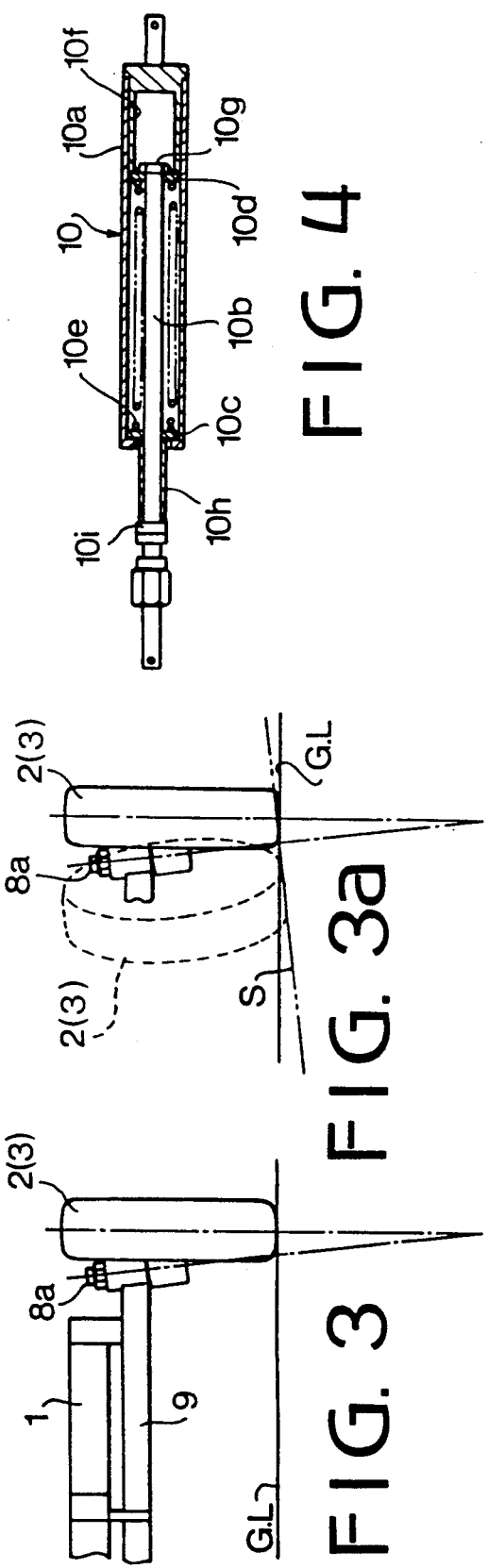
FIG. 2  FIG. 3  FIG. 3a  FIG. 4

FOUR WHEEL STEERING TRAILER

This application is a continuation of application Ser. No. 404,013 filed Sept. 7, 1989 abandoned.

BACKGROUND OF THE INVENTION

The present invention relates to a trailer towed by a tractor.

A conventional trailer comprises a trailer body having a pair of front wheels and a pair of rear wheels. A front tow bar and a rear tow bar are pivotally mounted on the center of the front portion and the center of the rear portion of the trailer body, respectively. By coupling these tow bars of the trailer to corresponding tow bars of the other trailers, a plurality of trailers are connected.

When the tractor tows a train of trailers, there is a problem that when the tractor returns a straight ahead driving after turning a corner at a high speed, the trailer can not trace the tractor, and hence the radius of the cornering of the trailer becomes larger. Although, some improvements are proposed, stability of trailers at high speed running is still insufficient. Further, a conventional trailer is inferior in straight ahead characteristic.

SUMMARY OF THE INVENTION

The object of the present invention is to provide a trailer which is improved in stability at high speed turning and in straight ahead characteristic.

According to the present invention, there is provided a trailer having a pair of front wheels and a pair of rear wheels each of which is rotatably supported on a knuckle arm pivotally mounted on a body of the trailer, front and rear tow bars each of which is pivotally mounted on a pivot secured to the body, a pair of front tie rods connecting front knuckle arms and the front tow bar, and a pair of rear tie rods connecting rear knuckle arms and the rear tow bar.

The trailer has a rear stabilizer provided between the rear tow bar and the body. The stabilizer has a spring for urging the rear tow bar to a straight-ahead position Further, a front stabilizer is provided between the front tow bar and the body.

The other objects and features of this invention will become understood from the following description with reference to the accompanying drawings

BRIEF DESCRIPTION OF DRAWINGS

FIG. 2 is a side view of the trailer;

FIG. 3 is a front view showing a part of a wheel of the trailer;

FIG. 3a is a front view showing the straight ahead characteristic of the wheel of FIG. 3;

FIG. 4 is a sectional view showing a stabilizer provided in the trailer;

DETAILED DESCRIPTION OF THE PREFERRED EMBODIMENT

Figure 1:
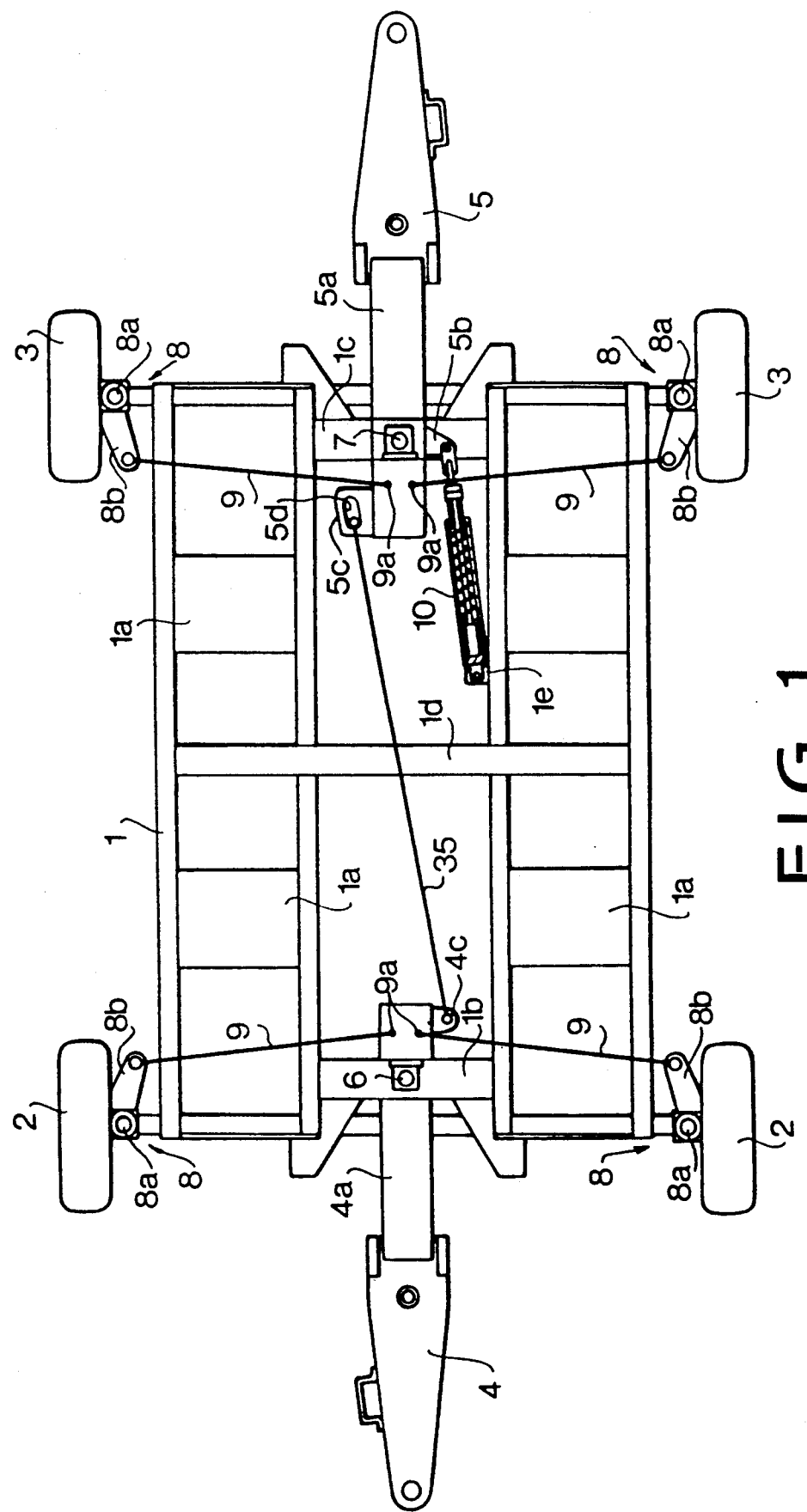
FIG. 1 is a plan view of a trailer according to the present invention.

Referring to FIGS. 1 and 2, a trailer of the present invention comprises a trailer body 1 and a pair of front wheels 2 and a pair of rear wheels 3 rotatably mounted on knuckle arms 8 through axles, respectively. Each knuckle arm 8 is pivotally mounted on a shaft 8a secured to trailer body 1. The shaft 8a is inwardly tilted about 8° from a vertical as shown in FIG. 3, thereby improving the straight ahead characteristic. The trailer body 1 has longitudinal floor boards 1a, a front beam 1b and a rear beam 1c secured between the floor boards 1a respectively, and a central beam 1d traversely provided in the center of the body 1.

A front tow bar 4 is connected to a front steering member 4a which is pivotally mounted on the center of the front beam 1b through a pivot 6. Thus, the front tow bar 4 is pivotable about the pin 6. Similarly, a rear tow bar 5 is pivotally mounted on the rear beam 1c through a rear steering member 5a and a pin 7. A free end of each knuckle arm 8 is connected to a tie rod 9 which is pivotally connected to the steering member 4a(5a) at an inner end portion thereof through a pin 9a.

A stabilizer 10 is pivotally connected between the rear steering member 5b and one of floor boards 1a. Referring to FIG. 4, the stabilizer 10 comprises a cylinder 10a, piston rod 10b slidably mounted in the cylinder 10a, piston plate 10c slidably mounted on the rod 10b, piston plate 10d slidably mounted on the rod 10b, stopper ring 10g secured to an end of the rod 10b, spring 10e provided around the rod 10b between piston plates 10c and 10d, stopper sleeve 10h rotatably mounted on the rod 10b between a flange 10i and plate 10c, and a cylindrical stopper 10f receiving the piston plate 10d a shown in FIG. 1. The cylinder 10a is pivotally connected to one of the floor boards 1a through a lug 1e and the rod 10b is pivotally mounted on a lug 5b of steering member 5a of the rear tow bar 5. When the rod 10b is moved to the left, the piston plate 10d compresses the spring 10e, and when the rod is moved to the right, piston plate 10c compresses spring 10e. Thus, the steering member is urged to a straight-ahead position. Steering members 4a and 5a have projections 4c and 5c on opposite sides, respectively. A cross rod 35 is diagonally connected between projections 4c and 5c. The cross rod 35 is engaged with an elongated slot 5d of the projection 5c.

When the tractor tows a plurality of trailers coupled to one after another in the form of a train of trailers, front wheels 2 and rear wheels 3 of the trailer are steered to a straight-ahead position by means of knuckle arms 8. When the tractor turns, for example, to the right, the front tow bar 4 is clockwisely pivoted about the pin 6, so that front wheels 2 are turned to the right. Since the rear wheels 3 are urged to the straight-ahead position by the stabilizer 10, the trailer travels in stable steering operation. After cornering, the rear tow bar 5 and rear wheels 3 quickly return to the straight-ahead position in accordance with operation of the stabilizer 10. Thus, the trailer is prevented from outwardly expanding at cornering, thereby ensuring a stable travelling of the train of trailers. When the steering angle exceeds the range of the slot 5d at cornering, the rear wheels 3 are steered by the steering member 4a through the cross rod 35. Thus, the trailer turns the corner at a small radius.

Referring to FIG. 3a, since the shaft 8a is tilted, when the wheel 2 pivots about the shaft, the grounding surface of the wheel 2 intends to roll on the supposititious surface S which is perpendicular the axis of the shaft 8a. Since the surface S is lower than the ground level GL, the wheel can not run on the surface and is elevated to the straight ahead position. Thus, the wheels run straight ahead.

Figure 5:
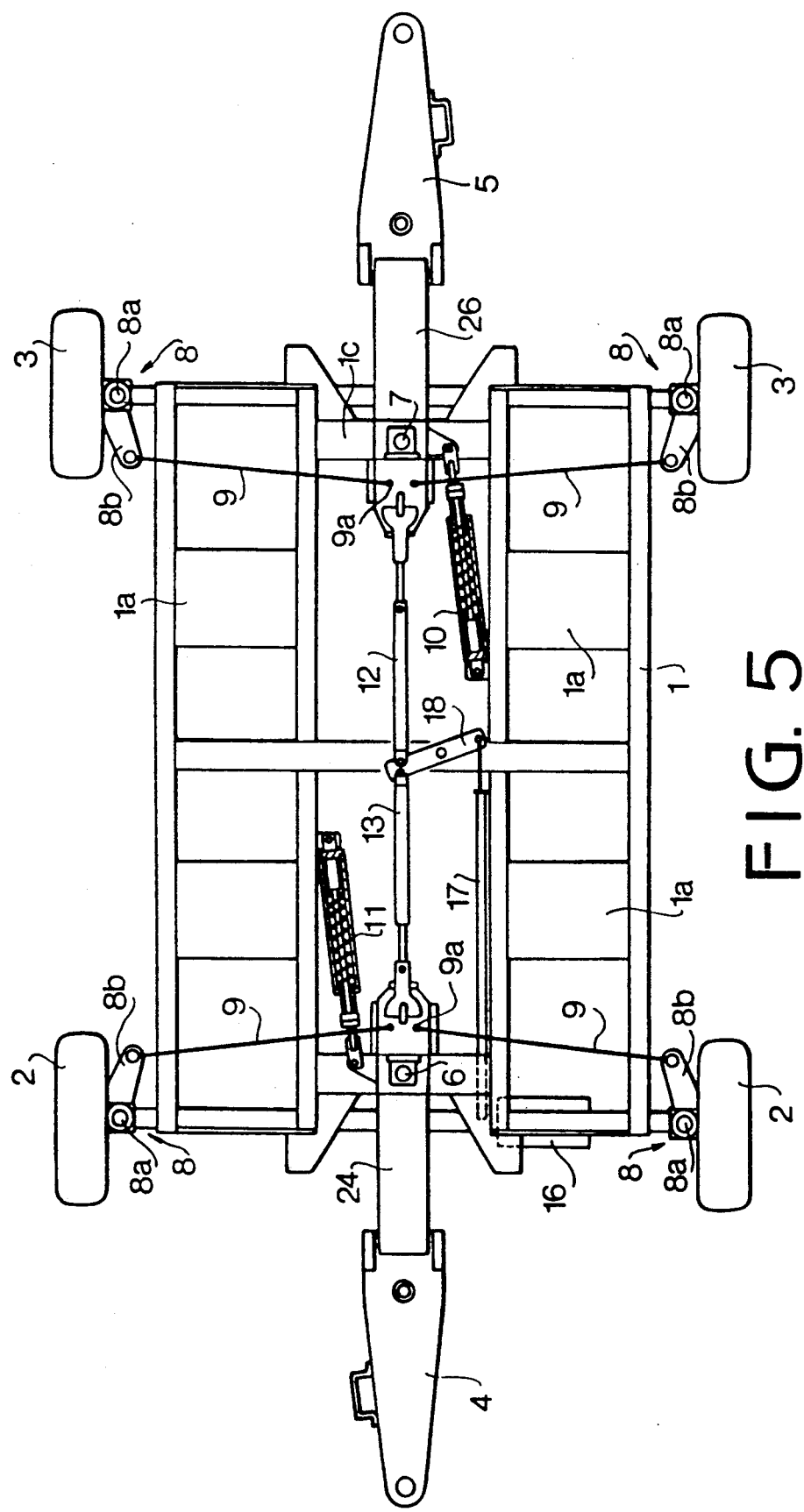
FIG. 5 is a plan view showing a second embodiment of the present invention.

FIG. 5 shows a second embodiment of the present invention. In this embodiment, a stabilizer 11 having the same construction as stabilizer 10 is provided between a front steering member 24 and the trailer body 1 in the same manner as stabilizer 10. Thus, the trailer can be towed in the reverse direction in the same stable manner as the forward travelling. The trailer has a steering mechanism different from the trailer of FIG. 1. A front tow bar 24 is separated from a steering member 25. Therefore, tow bar 24 and steering member 25 are pivotally mounted on the pivot 6, respectively. A rear tow bar 26 and a steering member 27 are the same as the front ones. In the trailer, a locking mechanism is provided. The mechanism comprises a wheel rotational direction detector 16, links 17 and 18, and longitudinally movable rods 12 and 13 which are pivotally connected to the link 18.

Figure 6:
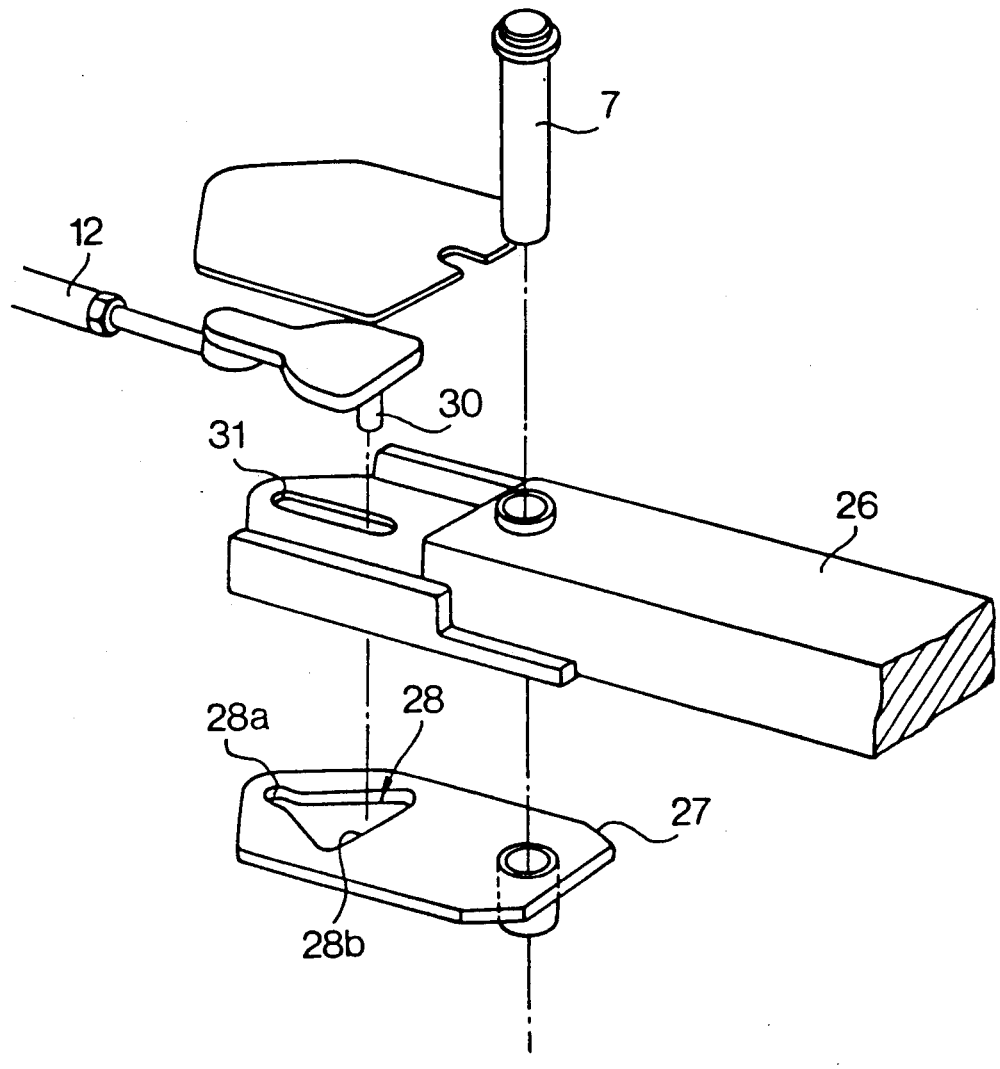
FIG. 6 is an exploded perspective view of a rear locking device.

As shown in FIG. 6, the rod 12 has a vertical slide pin 30 which is slidably engaged with a slot 31 formed in the rear tow bar. Under the tow bar 26, a steering plate 27 is pivotally mounted on the pin 7. The steering plate 27 has a hole 28 comprising a locking hole 28a having a small width and a release hole 28b having a wide width. The slide pin 30 engages with the hole 28. Tie rods 9 are connected to the steering plate 27. The locking device for the front tow bar 24 is the same as the rear locking device.

FIG. 5 shows the rearward travelling state where the rods 12 and 13 are at the left end position, where the pin 30 engages with the locking hole 28a. Thus the rear tow bar 26 and steering plate 27 are locked with each other. When the travelling direction is reversed, the change of rotational direction of the wheels 2 is detected by the detector 16 to pull the link 17. Thus, the bars 12 and 13 are moved to the right, thereby releasing the tow bar 26 and locking the tow bar 24.

Figure 7:
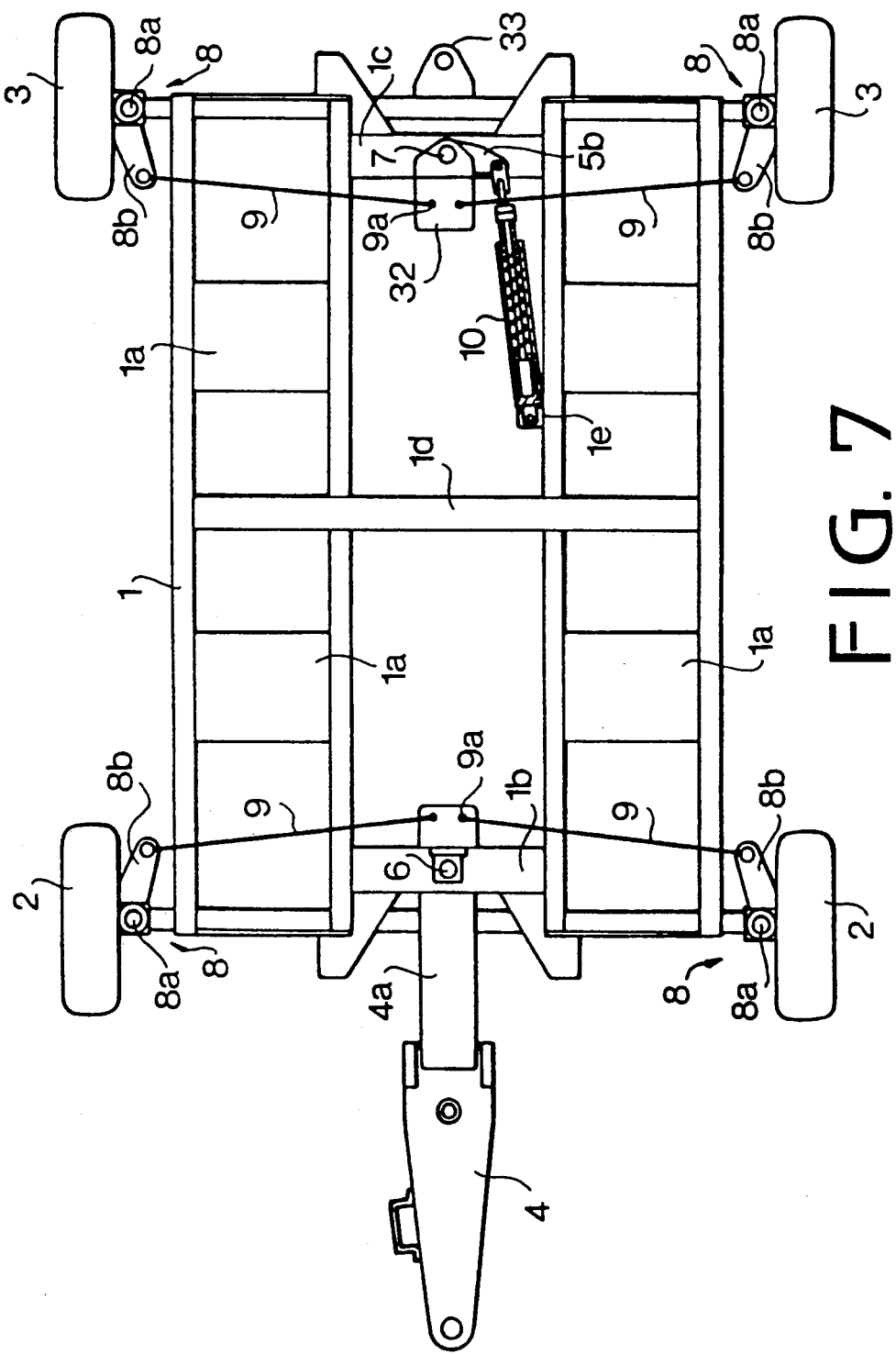
FIG. 7 is a plan view showing a third embodiment of the present invention.

FIG. 7 shows a third embodiment. The trailer has a fixed tow plate 33 at a rear portion of the body and a steering plate 32 pivotally mounted on the pin 7. Tie rods 9 are connected to the steering plate 32. Other portions are the same as the first embodiment of FIG. 1.

In accordance with the present invention, the trailer is provided with a stabilizer on a rear tow bar. When a plurality of trailers towed by the tractor make a turn, rear wheels of trailers quickly return to the straight-ahead positions in accordance with the operation of the stabilizer, tie rods and the knuckle arms. Thus, stable travelling of the trailer at a high speed can be ensured.

While the presently preferred embodiment of the present invention has been shown and described, it is to be understood that this disclosure is for the purpose of made without departing from scope of the invention as set forth in the appended claims.

What is claimed is:

1. A trailer having a body, a pair of front wheels and a pair of rear wheels each wheel of which is rotatably supported on a knuckle arm pivotally mounted for rotation about an axis on aid body of said trailer, said knuckle arm being inwardly tilted from a vertical axis relative to said trailer body toward said body so as to support said pair of front wheels and said pair of rear wheels on said trailer body for rotation about horizontal axes when said pair of wheels are rotated in a straight ahead direction and for tipping said wheels when said pairs of said paired wheels are rotated in directions to the right or left of said straight ahead direction, a front tow bar pivotally mounted on a front steering member pivotally secured to the body, a rear steering member pivotally mounted on a rear portion of said body, a pair of front tie rods connecting the knuckle arms of said pair of front wheels and said front steering member, and a pair of rear tie rods connecting said knuckle arms of said pair of rear wheels and said rear steering member, the trailer comprising:

a rear stabilizer between said rear steering member and said body, the rear stabilizer comprising a cylinder, a piston rod slidably mounted in said cylinder at an end thereof, a first piston plate slidably mounted in said cylinder on said piston rod, a second piston plate slidably mounted in said cylinder on said piston rod, a compression spring in said cylinder around said piston rod and between said first and second piston plates, a stopper ring secured in said cylinder to an end of said piston rod at said second plate, a stopper sleeve mounted on said piston rod between a flange formed on an end of said piston rod and said first piston plate, and a cylinder stopper in said cylinder at said end of said piston rod for stopping said second piston plate, said cylinder being pivotally connected to said body, and the piston rod being pivotally connected to said steering member, whereby said piston rod, said first and second piston plates and said compression spring in said cylinder are protected from dust, water and mud and prevented from rusting and said stabilizer urges said rear steering member and said rear pair of wheels to said straight-ahead direction.

2. The trailer according to claim 1 wherein said front and rear steering members are front and rear tow bars respectively.

3. The trailer according to claim 1 further comprising a front stabilizer between said front tow bar and said body.

4. The trailer according to claim 1 further comprising front and rear locking devices each, respectively, comprising a steering plate pivotally mounted on each of said front and rear steering members and connected to said front and rear tie rods, respectively, and means for connecting said steering plate with said front and rear tow bar respectively so as to pivot together when the locking device is effected.

* * * * *